United States Patent [19]
Wils

[11] Patent Number: 5,150,509
[45] Date of Patent: Sep. 29, 1992

[54] METHOD OF PRODUCING A STABILIZED BOLT JOINT BETWEEN A TIMBER ELEMENT AND ANOTHER CONSTRUCTION ELEMENT AND THE TIMBER CONSTRUCTION

[75] Inventor: Tom L. Wils, Fruens Böge, Denmark

[73] Assignee: Kompan A/S, Denmark

[21] Appl. No.: 769,224

[22] Filed: Oct. 1, 1991

Related U.S. Application Data

[63] Continuation of Ser. No. 672,564, Mar. 29, 1991, which is a continuation of Ser. No. 440,873, Nov. 24, 1989, abandoned, which is a continuation of Ser. No. 124,681, Nov. 23, 1987, abandoned, which is a continuation of Ser. No. 730,189, May 3, 1985, abandoned.

[30] Foreign Application Priority Data

May 3, 1984 [DK] Denmark .............. 1293/84

[51] Int. Cl.⁵ .................. B23P 11/02; F16B 43/02
[52] U.S. Cl. ......................... 29/525.1; 29/897.3
[58] Field of Search .............. 29/525.1, 897.3, 897.31, 29/897.312, 897.35; 52/506, 698; 403/388, 408.1; 411/338, 339, 546, 910, 429, 430, 431, 373, 375, 376, 377

[56] References Cited

U.S. PATENT DOCUMENTS

| | | |
|---|---|---|
| 1,055,706 | 3/1913 | Burton . |
| 1,399,942 | 12/1921 | Dowd . |
| 2,883,012 | 4/1959 | Hoffman . |
| 3,296,691 | 1/1967 | Bien . |
| 3,298,725 | 1/1967 | Boteler . |
| 3,333,874 | 8/1967 | Gelfarb . |
| 4,383,478 | 5/1983 | Jones . |
| 4,475,859 | 10/1984 | Oliver . |

FOREIGN PATENT DOCUMENTS 32444 7/1981 European Pat. Off. .

Primary Examiner—Timothy V. Eley
Attorney, Agent, or Firm—Antonelli, Terry, Stout & Kraus

[57] ABSTRACT

In order to stabilize a timber bolt joint against coming loose when the timber shrinks the bolt hole in the timber element is made with oversize and a bushing of Nylon is inserted with tight fit in the hole, the bushing having substantially the same length as the hole. When the bolt nut is tightened it is primarily the bushing, which is clamped, and thereafter the stability of the joint will be safeguarded even if or when the timber shrinks.

20 Claims, 1 Drawing Sheet

METHOD OF PRODUCING A STABILIZED BOLT JOINT BETWEEN A TIMBER ELEMENT AND ANOTHER CONSTRUCTION ELEMENT AND THE TIMBER CONSTRUCTION

CROSS REFERENCE TO RELATED APPLICATIONS

This application is a continuation application of U.S. application Ser. No. 672,564 filed Mar. 20, 1991, which is a continuation application of U.S. application Ser. No. 440,873, filed Nov. 24, 1989, now abandoned, which is a continuation of U.S. application Ser. No. 124,681, filed Nov. 23, 1987, now abandoned which is a continuation application of U.S. application Ser. No. 730,189, filed May 3, 1985, now abandoned.

BACKGROUND OF THE INVENTION

The present invention relates to a method of joining timber elements with other construction parts by a clamping bolt put through a hole in the timber element. It is a well known phenomenon that both new and aged timber may shrink in its cross plane and that it may be necessary from time to time, therefore, to tighten up the bolt joints.

This, of course, amounts to a general problem, but the problem is particularly pronounced in such constructions, in which the bolt joints are desired to be protected against wanton destruction, as in such cases it is not even possible to tighten up the bolts or nuts. A bolt or nut protection of this type is used extensively in public park and playground equipment, e.g. benches and playing devices, which may include timber elements, to which other timber elements or parts of other materials are joined by bolting. It is at this place sufficient to mention that prior attempts to solve the said problem have generally failed.

It is the purpose of the invention to provide a method, whereby the bolt joint is preparable such that it will not have to be tightened up later on.

The invention is based on the consideration that with ordinary simple bolt joints of or between timber portions the joined portions should not be held together so as to be locked against mutual rotation about the bolt by virtue of the tightening force of the single bolt, inasfar as a desired non-rotatability of the portions or element will normally always be achieved by the use of an extra bolt joint spaced from the first one or by some other type of additional connection between the bolted together portions or elements. Thus, what should be ensured is that the bolted together elements cannot "slop" or get mutually twisted as the timber element or elements shrink.

SUMMARY OF THE INVENTION

Against this background, according to the invention, a stabilization of the bolt joint is effected by mounting in the hole of the timber element a lining bushing of a rigid material and of a length at least roughly corresponding to the length of the bolt hole, whereafter the bolt/nut is tightened until the bolt head or the nut is firmly rested against the respective outer end of the bushing, while the opposite end of the bushing is correspondingly firmly rested against either the opposed head or nut portion of the bolt or against a rigid surface portion of the construction element, with which the timber element is joined, i.e. the surface portion of the latter element as immediately surrounding the mounting hole of the bolt. The diameter of this hole should thus be only slightly larger than the bolt diameter, while the hole in the timber element should be wide enough to receive the lining bushing. The latter should be received in the timber hole a snug fit such that it is untiltable therein.

When hereby the lining bushing is axially rigidly clamped it will be maintained clamped even if or when the timber shrinks. The timber element as such will then not be clamped by the bolt, i.e. it might rotate about the bolt or about the bushing, but as mentioned this ability will be without any practical significance. What is important is that the bushing is held in the timber element in a non-tiltable manner and is held axially clamped and thereby stabilized against loose tilting to the construction element, with which the timber element is bolt connected. The stability of the joint will be secured hereby, irrespective of shrinkage of the timber.

Even by the mounting and tightening of the bolt it will be unimportant whether the timber element is actually engaged by the bolt structure, i.e. the head or nut of the bolt, when it is only secured that the bushing is tightly axially clamped. Another requirement, of course, is that the bushing is made of a practically non-shrinkable pressure resistant material, preferably Nylon or the like, while it is presupposed that the bolt is of a practically non-stretchable character.

BRIEF DESCRIPTION OF THE DRAWINGS

In the following the invention is described in more detail with reference to the drawing, in which:

FIG. 1 is a sectional view of a joint between a timber element and a construction element of stable thickness, while

DETAILED DESCRIPTION OF THE PRESENT INVENTION

Figure 1:
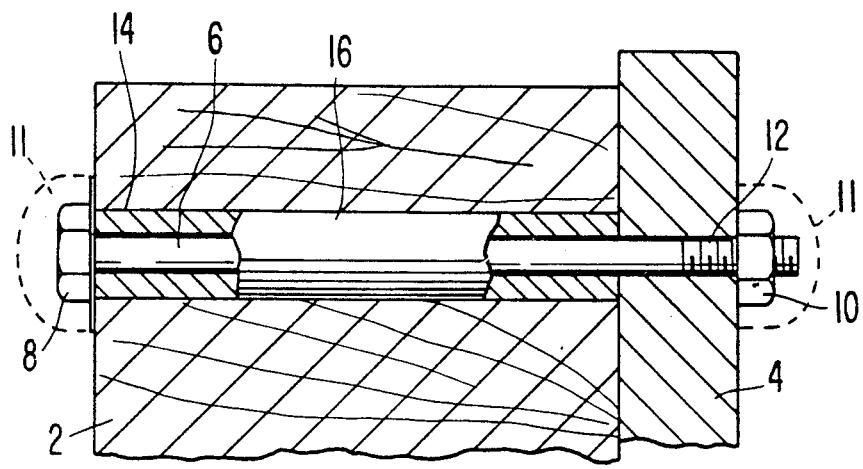

In FIG. 1 is shown a timber portion 2, e.g. a post, which is bolted together with a construction element 4 of practically non-changable thickness by a bolt 6 having a bolt head 8 and a nut 10. The bolt 6 projects through a narrow bolt hole 12 in the element 4 and through a wider hole 14 in the timber element 2. A rigid inflexible lining bushing 16 is inserted in the hole 14 with tight fit, this bushing being of a substantially non-shrinkable pressure resistant material such as metal or preferably plastic, e.g. Nylon, and having a length equal to or only slightly smaller than the thickness of the timber portion 2. The length of the bushing 16 may even be slightly larger than the thickness.

When the nut 10 is tightened the bolt head 8 is forced against the relevant end of the bushing 16 as well as against the surface of the timber portion 2, and the opposite end of the bushing will be forced against the inner surface of the rigid construction element 4, which may be of metal or hard wood, against the outside of which the nut is tightened home, preferably by intermediate of a washer (not shown).

If or when the timber portion later shrinks such shrinking will not change the fact that the bushing 16 is still tightly axially clamped in a position perpendicular to the interior surface of the hard construction element 4, and the shrinkage, therefore, will not give rise to any relevant loosening of the joint, since, as mentioned, a possible mutual rotatability of the joined elements about the axis of the bolt can be neglected.

It will make no difference, of course, whether the bolt is mounted with inverted orientation, and it will be appreciated that after the tightening of the bolt both the nut and the bolt head may be provided with a cover cap 11 as shown in dotted lines. The such cover caps associated with the base elements may even be of an absolutely non-removable type since there is no need for the nut to be tightened and is, therefore, totally inaccessible.

Even though a mutual rotatability of the joined elements will be unimportant in practice it is nevertheless preferred to provide the bushing 16 with outer longitudinal ribs or to otherwise secure the bushing in a non-rotatable or difficult rotatable manner in the hole of the timber element, whereby the tightly axially clamped and thus practically non-rotatable bushing will anyway further stabilize the joint. Likewise the bushing may be provided with end protrusions for engagement with the surface of the construction element 4 or with a bed member under the bolt head 8; such a bed member may itself be secured to the outside of the timber element in a non-rotatable manner.

Figure 2:
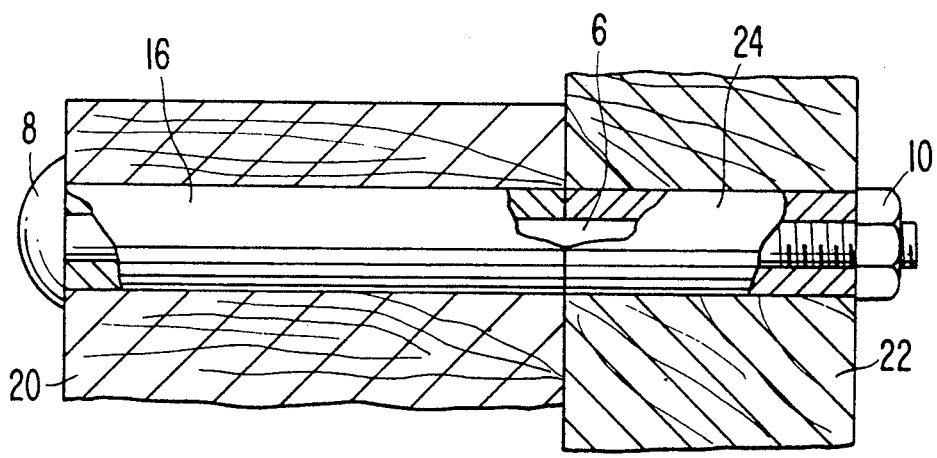
FIG. 2 is a corresponding view of a joint between two timber elements.

In FIG. 2 is shown a bolt connection between a whole section timber 20 and a half-section timber 22. Inasfar as even the half-section timber may shrink a tightening of the bushing 16 to the half-section timber 22 would be unreliable, and for this reason there is mounted, also in the half-section timber, a corresponding bushing 24 of a correspondingly adapted length. When the bolt is tightened the real result will be a tightening together of the bushing portions 16 and 24, but inasfar as this joined bushing is non-tiltably connected with both of the timber elements, then the joint will remain rigid even when both of the elements shrink by and by.

Figure 3:
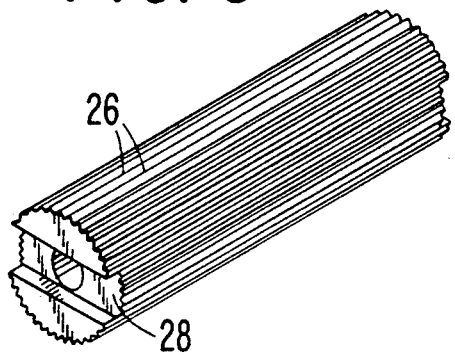
FIG. 3 is a perspective view of a preferred embodiment of a lining bushing for use in such joints.

The bushing as shown in FIG. 3 is made of Nylon and is provided with outer longitudinal ribs 26 which cut themselves into the wall of the hole in the timber when the bushing is pressed into the hole. Moreover it is shown that the ends of the bushing are provided with a recess 28, which is adapted to receive in a non-rotatable manner a protrusion on or of a non-illustrated bed member under the bolt head and/or nut, such bed member being operable to receive a covering cap member 11 in a removable or non-removable manner.

What is claimed is:

1. A method of joining a timber element with at least one construction element by a clamping bolt, each of said timber element and the at least one construction element having at least on through hole therein for accommodating the clamping bolt, a diameter of the through hole in the timber element is oversized relative to a diameter of the clamping bolt, the method comprising the steps of mounting a rigid inflexible lining bushing having two interconnected opposed end portions and formed of a hard and substantially non-shrinkable pressure-resistant material in the through hole in the timber element with a tight fit therein and with a length substantially corresponding to an axial length of the through hole in the timber element, joining the timber element and the at least one construction element together by a tightening of the clamping bolt projecting through the lining bushing such that opposed end portions of the rigid lining bushing are acted upon by a tightening pressure of said clamping bolt with the portion of the hard and substantially non-shrinkable pressure-resistance material of the rigid lining bushing interconnecting the end portions being substantially nondeformed by the tightening pressure of the clamping bolt so that the timber element and the at least one construction element, upon a shrinking of the at least one timber element are mutually held by engagement with the lining bushing.

2. A method according to claim 1, wherein the at least one construction element is of a hard and substantially non-shrinkable material, and the through hole in the at least one construction element has a diameter narrower than the diameter of the at least one through hole in the timber element, wherein the rigid inflexible lining bushing is mounted in the through hole of the timber element so as to be tightened against a surface of the at least one construction element adjacent the through hole of the at least one construction element.

3. A method according to claim 1, wherein the rigid inflexible lining bushing is mounted in the through hole of the timer element in a non-rotatable manner, and wherein the method further comprises the steps of non-rotatably connecting an outer end of the rigid inflexible lining bushing with a bed member under a bolt head or nut at said outer end, and using said bed member as a mounting bed for accommodating an outer cap member for covering the bolt head or nut.

4. A method according to claim 1, when the lining bushing is formed of nylon.

5. A method of joining at least one timber element and at least one construction element by a clamping bolt means, each of said at least one timber element and said at least one construction element having at least one through hole therein for accommodating the clamping bolt means, the at least one through hole in the at least one timber element having a diameter greater than a diameter of the clamping bolt means, the method comprising the steps of:

aligning the through holes in the at least one timber element and the at least one construction element;

providing a rigid inflexible lining bushing means having two opposed interconnected end portions and a substantially constant outer diameter and formed of a hard and substantially non-shrinkable pressure-resistant material, said outer diameter of said lining bushing means being of a size sufficient to insure a snug fit along substantially an entire axial length of the through hole of at least one timber element;

inserting the lining bushing means in the through hole of the at least one timber element;

inserting the clamping bolt means through the lining bushing means and the through hole of the at least one construction element; and tightening the clamping bolt means so as to secure the at least one timber element to the at least one construction element by applying clamping forces on each of the opposed end portions of the lining bushing means such that the opposed end portions are acted upon by the clamping forces with the portion of the hard and substantially non-shrinkable pressure-resistant material of the rigid lining bushing means interconnecting the end portions being substantially non-deformed by the clamping forces so that the at least one timber element and the at least one construction element, upon a shrinking of the at least one timber element, are mutually held by engagement with the bushing.

6. A method according to claim 5, wherein the lining bushing means is formed of nylon.

7. A construction comprising at least one timber member, and at least one through hole provided in said at least one timber member, at least one construction member, at least one through hole provided in the at least one construction member, a clamping bolt means for joining said at least one timber member to said at least one construction member, said at least one through hole in said at least one timber member having a diameter greater than an outer diameter of said clamping bolt means, and a rigid inflexible lining bushing means disposed in the at least one through hole in the at least one timber member for accommodating said clamping bolt means, said lining bushing means having opposed end portions and a substantially constant outer diameter and being formed of a hard and substantially non-shrinkable pressure-resistant material, said outer diameter of said lining bushing means being of a size sufficient to ensure a snug fit along substantially an entire length of the at least one through hole in the at least one timber member whereby, upon a tightening of the clamping bolt means, substantial clamping forces are applied on each of the opposed end portions of the lining bushing means so that the lining bushing means is maintained in an axially rigid clamped position even upon a shrinking of the at least one timber member thereby securing a stable rigid joint between the at least one timber member and the at least one construction member, with the portion of the hard and substantially non-shrinkable pressure-resistant material of the rigid lining bushing means interconnecting the opposed end portions being non-deformed by the application of the clamping forces.

8. A construction element according to claim 7, when the lining bushing means is formed of nylon.

9. A construction according to claim 7, when means are provided for non-rotatably mounting said lining bushing means in said at least one through hole in said at least one timber member.

10. A construction according to claim 9, wherein said means for non-rotatably mounting includes a plurality of longitudinally extending rib means provided on an outer circumferential surface of the lining bushing means for engaging portions of a wall of the at least one through hole of the at least one timber member when the lining bushing means is inserted in said through hole of said at least one timber means.

11. A construction according to claim 10, wherein means are provided on at least one end of the lining bushing means for accommodating a portion of a further member of the joint of the timber member and the construction member.

12. A construction according to claim 7, wherein the construction member is a further timber member.

13. A method of joining a first timber element to a second timber element by a clamping bolt means, each of said first and second timber elements having at least one through hole therein for accommodating the clamping bolt means, the at least one through hole of each of the first and second timber elements having a greater diameter than a diameter of the clamping bolt means, the method comprising the steps of:
aligning the through holes in the first and second timber elements;
providing a first lining bushing having a substantially constant outer diameter and formed of a hard substantially non-shrinkable material, said outer diameter of said first lining bushing means being of a size substantially equal to an entire axial length of the at least one through hole of the first timber element;
providing a second lining bushing means having a substantially constant outer diameter and formed of a hard substantially non-shrinkable material, said outer diameter of the first lining bushing means being of a size sufficient to ensure a snug fit along substantially an entire axial length of the at least one through hole of the second timber element;
inserting the first lining bushing means in the at least one through hole of the first timber element;
inserting the second lining bushing means in the at least one through hole of the second timber element;
inserting the clamping bolt means through the first and second lining bushing means;
tightening the clamping bolt means so as to secure the first timber element to the second timber element by applying clamping forces on each end of each of the first and second lining bushing means.

14. A method according to claim 13, wherein the first and second lining bushing means are formed of nylon.

15. A construction comprising first and second timber members, each of said first and second timber members having at least one through hole provided therein; a clamping bolt means for joining said first and second timber members, said at least one through hole in each of said first and second timber members having a diameter greater than an outer diameter of said clamping bolt means; and first and second lining bushing means disposed in said at least one through hole of said first and second timber members, respectively, for accommodating said clamping bolt means, said first and second lining bushing means having a substantially constant outer diameter and being formed of a hard substantially non-shrinkable material, said constant outer diameter of said first and second lining bushing means being of a size sufficient to ensure a sung fit along substantially an entire axial length of the at least one through hole of the first and second timber members, respectively; whereby, upon tightening of the clamping bolt means, substantial clamping forces are applied on respective ends of the first and second lining bushing means so that the first and second lining bushing means are maintained in an axially rigid clamped position even upon shrinking of the first and second timbers, thereby securing a stable joint between the first and second timber means.

16. A construction according to claim 15, wherein the lining bushing means is formed of Nylon.

17. A construction according to claim 15, wherein means are provided for non-rotatably mounting said lining bushing means in said at least one through hole of said at least one timber means.

18. A construction according to claim 17, wherein means for non-rotatably mounting includes a plurality of longitudinally extending rib means provided on an outer circumferential surface of the lining bushing means for engaging portions of a wall of the at least one through hole of the at least one timber member when the lining bushing means is inserted into said through hole.

19. A construction according to claim 18, wherein means are provided on at least one end of the lining bushing means for accommodating a portion of a further member of the joint of the timber member and the construction member.

20. A timber construction comprising a timber element adapted to be joined with another construction element by a clamping bolt, each of said timber element and the at least one construction element having a through hole therein for accommodating the clamping bolt, wherein a diameter of the through hole in the timber element is oversized relative to a diameter of the clamping bolt and a rigid inflexible lining bushing having two interconnected opposed end portions and formed of a hard substantially non-shrinkable pressure-resistant material is mounted in the through hole of the timber element with a tight fit therein and with a length substantially corresponding to a length of the through hole, in the timber element, the clamping bolt being tightened such that substantial clamping forces axially act on each of the opposed end portions of the rigid inflexible lining bushing with the portion of the hard and substantially non-shrinkable pressure-resistant material of the rigid inflexible lining bushing interconnecting the end portions being substantially non-deformed by the clamping forces so that the timber element and the at least one other construction element, upon a shrinking of the timber element, are mutually held by engagement with the bushing.

* * * * *